US009964978B2

(12) United States Patent
Holveck et al.

(10) Patent No.: US 9,964,978 B2

(45) Date of Patent: May 8, 2018

(54) CONTROL SYSTEMS FOR MICROGRID POWER INVERTER AND METHODS THEREOF

(71) Applicant: Princeton Power Systems, Inc., Lawrenceville, NJ (US)

(72) Inventors: Mark Holveck, Sunnyvale, CA (US); Yevgeniy Kocherov, Bloomfield, NJ (US)

(73) Assignee: Princeton Power Systems, Inc., Lawrenceville, NJ (US)

( * ) Notice: Subject to any disclaimer, the term of this patent is extended or adjusted under 35 U.S.C. 154(b) by 282 days.

(21) Appl. No.: 14/685,954

(22) Filed: Apr. 14, 2015

(65) Prior Publication Data

US 2016/0306372 A1 Oct. 20, 2016

(51) Int. Cl.

| | |
|---|---|
| ***G05D 3/12*** | (2006.01) |
| ***G05D 5/00*** | (2006.01) |
| ***G05F 1/625*** | (2006.01) |

(52) U.S. Cl.

CPC .................................... *G05F 1/625* (2013.01)

(58) Field of Classification Search

CPC ....................................................... G06F 1/625

USPC ......................................................... 700/298

See application file for complete search history.

(56) References Cited

U.S. PATENT DOCUMENTS

| | | | |
|---|---|---|---|
| 6,078,162 A | 6/2000 | Hohmuth | |
| 7,116,010 B2 | 10/2006 | Lasseter et al. | |
| 7,521,825 B2 | 4/2009 | Lasseter et al. | |
| 7,687,937 B2 | 3/2010 | Lasseter et al. | |
| 7,715,950 B2 | 5/2010 | Lasseter et al. | |
| 7,787,272 B2 | 8/2010 | Lasseter et al. | |
| 7,834,479 B2 | 11/2010 | Capp et al. | |
| 7,920,942 B2 | 4/2011 | Lasseter et al. | |
| 7,932,637 B2 | 4/2011 | Lasseter et al. | |
| 7,983,799 B2 | 7/2011 | Bose et al. | |
| 8,183,714 B2 | 5/2012 | McDonnell | |
| 8,415,827 B2 | 4/2013 | Nagata | |
| 2009/0110214 A1* | 4/2009 | Litovsky ............... | H02J 7/0004 381/106 |
| 2011/0241423 A1* | 10/2011 | Bridges ................... | G06F 1/305 307/31 |

(Continued)

OTHER PUBLICATIONS

Lasseter et al., "CERTS Microgrid Laboratory Test Bed", IEEE Transactions on Power Delivery, Jan. 2011, 26(1), 325-332.

(Continued)

*Primary Examiner* — Robert Cassity

(57) ABSTRACT

The present invention provides control systems and methods for a power inverter. For example, a control system comprises a plurality of sensors and a controller. The plurality of sensors are configured to measure electrical signals that are indicative of output voltages and output currents of the power inverter. The controller, coupled to the power inverter, is configured to: determine a target power based on real power frequency droop information and a first frequency if the power inverter is in a voltage source mode; determine a target power based on a power limit and a predetermined power command if the power inverter is in a current source mode; and generate a second frequency based on the target power, a measured power, and a latency estimate of a simulated generator. The second frequency is used to control the output power of the power inverter.

21 Claims, 12 Drawing Sheets

200

(56) References Cited

U.S. PATENT DOCUMENTS

| | | | | |
|---|---|---|---|---|
| 2012/0259477 A1* | 10/2012 | Abido | H02J 3/38 | 700/297 |
| 2013/0073109 A1* | 3/2013 | Cheng | H02J 3/40 | 700/298 |
| 2013/0314959 A1* | 11/2013 | Hu | H02M 7/02 | 363/84 |
| 2015/0311716 A1* | 10/2015 | He | H02J 3/16 | 700/287 |
| 2016/0329713 A1* | 11/2016 | Berard | H02J 3/24 | |

OTHER PUBLICATIONS

"Stabilizing and Maximizing Renewables Using a Flywheel-Inverter System: RPI CFES Workshop on Microgrid Technology and Applications", ABB US, Oct. 10, 2013, 39 pages.

Torres et al., "Inverter-Based Diesel Generator Emulator for the Study of Frequency Variations in a Laboratory-Scale Autonomous Power System", Energy and Power Engineering, May 2013, 5, 274-283.

* cited by examiner

CONTROL SYSTEMS FOR MICROGRID POWER INVERTER AND METHODS THEREOF

FIELD OF THE INVENTION

The disclosed invention is in the field of power inverter control for microgrids.

BACKGROUND OF THE INVENTION

A microgrid is a local energy grid with control capability. It can disconnect from the traditional grid and operate autonomously. Due to increased power outages, microgrids are becoming more and more important. However, it is not very easy to set up a microgrid as it requires complicated microgrid management and communication systems with a centralized control. These communication systems require to coordinate between all sources and loads for the stable operation of the microgrid. If the central controller fails, the whole microgrid will fail. Thus, there is a need for systems and methods that efficiently coordinate between all sources and loads for the stable operation of the microgrid.

SUMMARY OF THE INVENTION

The present invention provides control systems for power inverters. For example, a control system comprises a plurality of sensors and a controller. The plurality of sensors can be configured to measure electrical signals indicative of output voltages and output currents of the power inverter. The controller, coupled to the power inverter, can be configured to: if the power inverter is in a voltage source mode, determine a target power based on real power frequency droop information and a first frequency; if the power inverter is in a current source mode, determine a target power based on a power limit and a predetermined power command; and generate a second frequency based on the target power, a measured power, and a latency estimate of a simulated generator.

The present invention provides control methods for power inverters. For example, a control method comprises: receiving an operation mode of the power inverter; if the operation mode of the power inverter is a voltage source mode, determining a target power based on real power frequency droop information and a first frequency; if the operation mode of the power inverter is a current source mode, determining a target power based on a power limit and a predetermined power command; and generating a second frequency based on the target power, a measured power, and a latency estimate of a simulated generator.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

Figure 1:
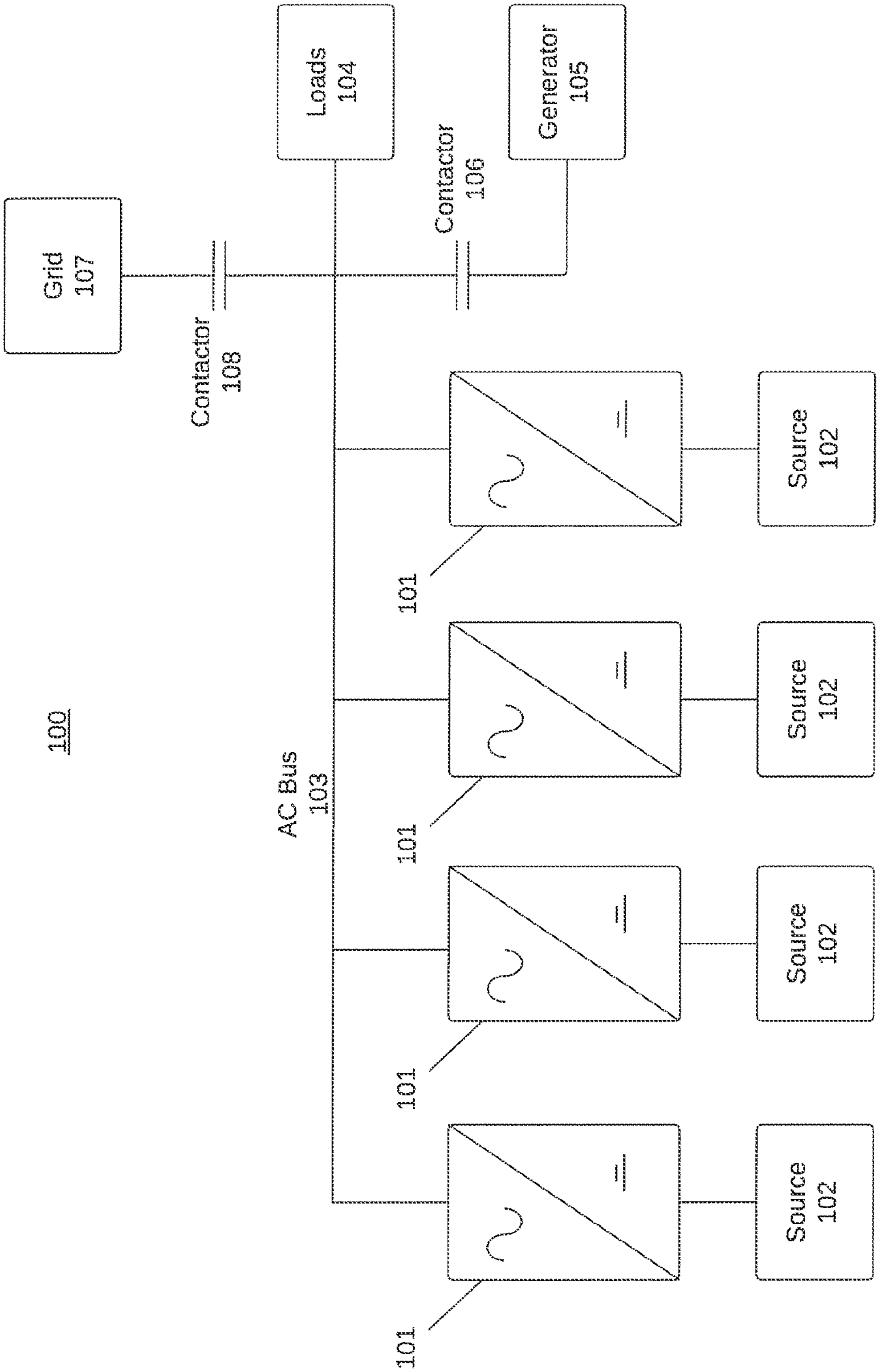
FIG. 1 is a block diagram of a typical microgrid system.

FIG. 1 illustrates a typical microgrid system containing power inverters, power sources, and loads. A microgrid 100 may include one or more power inverters 101, one or more power sources 102, and one or more loads 104. The power inverters 101 and the power sources 102 can be connected to a common AC bus 103 that provides power to the loads 104. One or more generators 105 may be connected to the microgrid 100 through the common AC bus 103. The generators 105 can be switched on and off using a contactor 106 so that the generators 105 can be isolated from the microgrid 100. The microgrid 100 can be connected to the utility grid 107 or isolated from it using a contactor 108.

The power inverters 101 can be connected to various power sources 102 such as batteries, solar arrays, fuel cells, micro turbines, wind turbines, or the like. Each power inverter 101 can operate in one of two modes: (1) grid-forming mode or voltage source mode; and (2) grid-following mode or current source mode. When the microgrid 100 is connected to the main grid 107, the power inverters 101 can operate in current source mode importing power from or exporting power to the main grid 107. When the microgrid 100 is isolated from the main grid 107, the power inverters 101 can operate in either current source mode or voltage source mode. For example, power inverters 101 that are connected to renewable energy sources such as solar arrays or wind turbines usually operate as a current source. Power inverters 101 that are connected to batteries usually operate as a voltage source when they form the microgrid 100, but can operate as a current source when they recharge the batteries using the generator 105. By changing a setting using an external controller or based on the status of the contactor 106 or 108, the power inverters 101 can dynamically set their operations to voltage source mode or current source mode. This can make the power inverters 101 very flexible and adaptable to different microgrid configurations.

Figure 2:
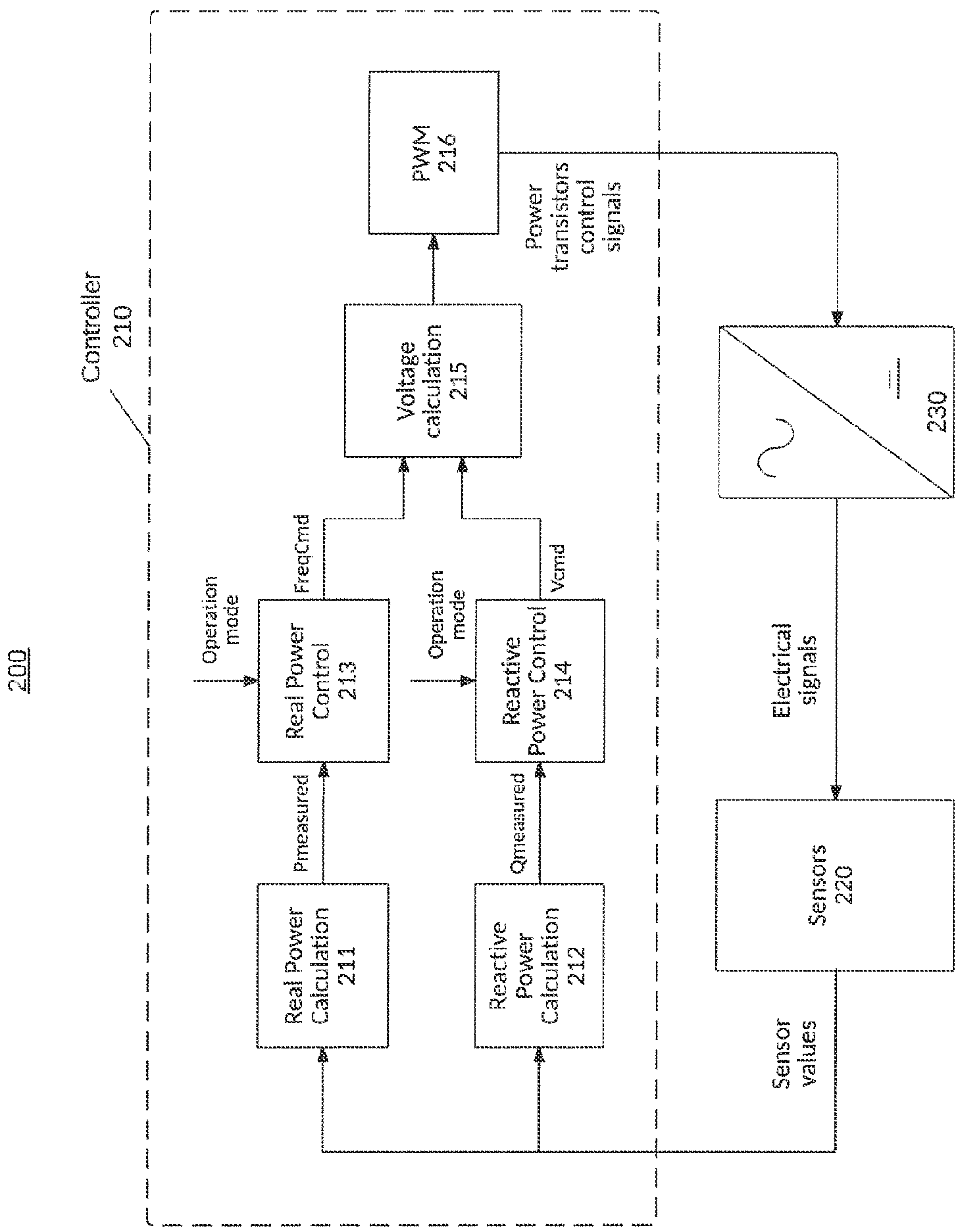
FIG. 2 is a block diagram illustrating a control system implementing the simulated generator-based control scheme in accordance with an embodiment.

FIG. 2 illustrates a control system that can implement the simulated generator-based control scheme in accordance with an embodiment. The control system 200 can comprise a controller 210, a plurality of sensors 220, and a power inverter 230. The controller 210 can interface with the power inverter 230 through the plurality of sensors 220. The plurality of sensors 220 can measure electrical signals that are indicative of output voltages and output currents of the power inverter 230. The electrical signals may include DC input voltage, DC input current, DC inductor current, DC central bus capacitor voltage, AC filter inductor currents, AC filter capacitor voltages, grid AC currents, or the like. The plurality of sensors 220 is operatively coupled to the power inverters 230, providing sensor values to the controller 210. The plurality of sensors 220 can be located within the power inverter 230, but it is not limited to the power inverter 230.

The controller 210 can read the electrical signals from the plurality of sensors 220 and determine a switching pattern for the power transistors to control the output power of the power inverter 230. For example, the controller 210 performs real power calculation 211 and reactive power calculation 212 using the electrical signals measured at the sensor 220. Once the real ($P_{measured}$) and reactive powers ($Q_{measured}$) are calculated, the controller 210 can perform real power control 213 to determine the frequency command (second frequency). Specifically, in the real power control 213, the controller 210 can first determine a target power based on frequency droop information. And then the controller 210 can calculate, based on the target power, the frequency command (FreqCmd). If the power inverter 230 is operating in voltage source mode, the controller 210 can determine the target power based on real power frequency droop information and a previous frequency (first frequency). If the power inverter 230 is operating in current source mode, the controller 210 can determine the target power based on power limits and a predetermined power command. In addition, the controller 210 can perform reactive power control 214 to determine the voltage magnitude command (Vcmd) after the reactive power is calculated.

After the real power control 213 and the reactive power control 214 are performed, the controller 210 can perform voltage calculation 215 based on the frequency command and the voltage magnitude command. For example, the controller 210 can calculate instantaneous 3-phase voltages at the voltage calculation 215. The instantaneous 3-phase voltages can be used to generate the power transistor control signals by means of pulse-width modulation (PWM) 216. With the power transistors control signals, the power inverter 230 can generate required currents and voltages. The controller 210 can comprise at least one of a processor, a microprocessor, a digital signal processor (DSP), or the like.

Figure 4A:
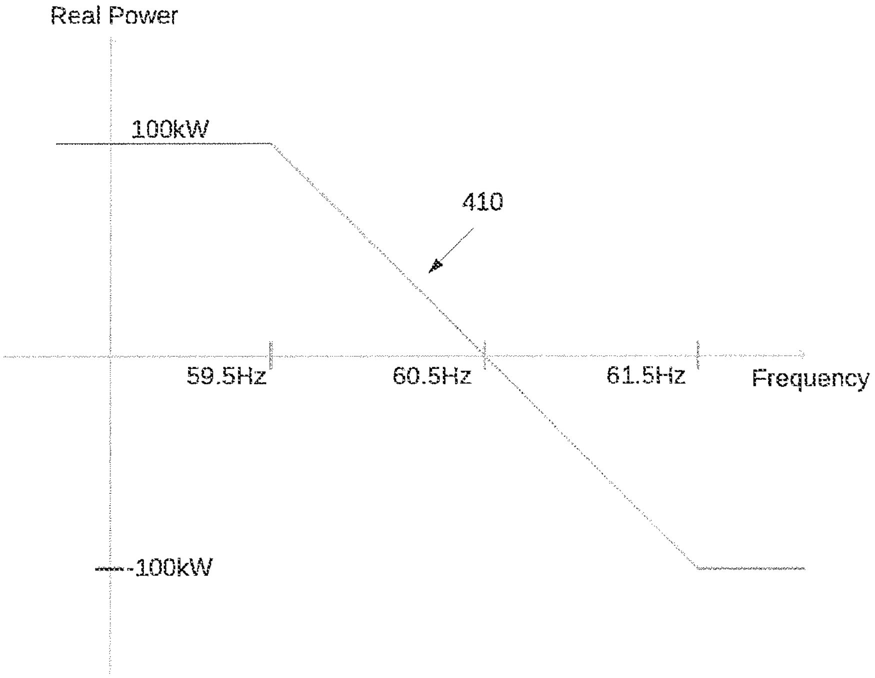
FIG. 4A is a graph illustrating real power vs. frequency droop in voltage source mode in accordance with an embodiment.

The real power frequency droop information used at the real power control 213 can represent correlation between frequency and real power associated with each of the operation mode of the power inverter 230. As illustrated in FIG. 4A, when the power inverter 230 is operating in voltage source mode, the controller 210 can determine the target power in accordance with the droop control line 410. For example, if the previous frequency (first frequency) received at the controller 210 is 60.5 Hz, the corresponding target power is 0 kW. As the frequency of the power inverter 230 decreases, the target power increases and as the frequency of the power inverter 230 increases, the target power decreases.

When the power inverter 230 is operating in current source mode, the controller 210 can determine the target power based on the power limits and a predetermined power command. The power limits can comprise a minimum power and a maximum power at a certain frequency. The minimum and maximum power can be determined based on the real power frequency droop information illustrated in FIG. 4B. The real power frequency droop information in FIG. 4B can include a low limit line 420 and a high limit line 430 within which the power inverter 230 can operate in current source mode. Outside the low 420 and high limit lines 430, the power inverter 230 can operate in voltage source mode. These power limits can stabilize the microgrid 100 in case of excessive or deficient power in the microgrid 100.

The maximum power can be determined in accordance with the high limit line 430. The minimum power can be determined in accordance with the low limit line 420. For example, if a previous frequency (first frequency) is 62.5 Hz, the maximum power at the first frequency is 0 kW in accordance with the high limit line 430. At the previous frequency, the minimum power is −100 kW in accordance with the low limit line 420. If the previous frequency is 58.3 Hz, the maximum power is 100 kW in accordance with the high limit line 430. At the previous frequency, the minimum power is 0 kW in accordance with the low limit line 420. When the power inverter 230 is being limited by the low 420 and high limit lines 430, it can effectively operate in voltage source mode because its behavior is similar to that of the voltage source mode.

The predetermined power command can be transmitted from various sources such as a utility grid, an external controller, the power inverter 230, or the like. If it comes from a utility grid, the power inverter 230 can receive it by means of a communication interface. The communication interface can be established when the power inverter 230 provides ancillary serveries to the utility, for example, frequency regulation. If the predetermined power command comes from an external controller, the power inverter 230 can receive it by means of a communication interface between the power inverter 230 and the external controller. The external controller may calculate the predetermined power command using energy management techniques, for example Peak Shaving, based on measurements from a power meter or time of the day.

In an embodiment, the predetermined power command can be set by a user via the front panel interface on the power inverter 230 while commissioning the system. In another embodiment, the predetermined power command can be internally calculated by the power inverter 230 when it is configured to operate as a PV inverter. For example, the power inverter 230 can use the max power point tracking (MPPT) technique to calculate the maximum available power at the PV array and set the power command to that value.

The target power in current source mode can be determined by comparing the predetermined power command to the power limits. Specifically, if the predetermined power command is lower than the minimum power, the controller 210 can set the target power to the minimum power. If the predetermined power command is higher than the maximum power, the controller 210 can set the target power to the maximum power. Otherwise, the target power can be set to the predetermined power command.

After the target power is determined, the controller 210 can calculate a frequency command (second frequency) using the target power, a measured power, and a latency estimate of a simulated generator. The measured power can be an output power at the power inverter 230. It can be calculated based on the electrical signals received from the plurality of sensors 220.

The latency estimate of a simulated generator can represent rotor inertia of the simulated generator. The rotor inertia of the simulated generator can be determined based on at least one of mass of the simulated rotor, shape of the simulated rotor, or power of the simulated generator. In general, mass and shape of a rotor of a real generator are used to calculate the rotor inertia. This means that if the rotor of the real generator is comparable to the rotor of the simulated generator, the mass and shape of the rotor of the real generator can be used to determine the rotor inertia of the simulated rotor. Moreover, if a real generator has comparable power to the simulated generator, the rotor inertia of the real generator can be selected for that of the simulated generator. For example, the inertia of a 100 kW generator can be used for 100 kW power inverter. The rotor inertia of the simulated generator can be adjusted by performing transient response tests to ensure stability of the microgrid 100.

In an embodiment, the controller 210 can adjust the latency estimate depending on the mode of operation in the power inverter 230. For example, if the power inverter 230 is in voltage source mode, the controller 210 can select a first latency estimate from a plurality of preset latency estimates. If the power inverter 230 is in current source mode, the controller 210 can also select a second latency estimate from the plurality of preset latency estimates. The first and second latency estimates can be the same or different. By adjusting the latency estimate, the power inverter 230 can stabilize the microgrid 100 when it changes the mode of operation. For example, when the power inverters 230 are connecting to the generators, the power inverters 230 may response too fast, thereby resulting in excessive power generation. This may cause unstable status of the microgrid 100. However, since the controller 210 can simulate the behavior of the generators with the latency estimate, the power inverters 230 can be easily connected to the generators without causing excessive power generation.

Once the frequency command (second frequency) and the voltage magnitude command are determined at the real power control 213 and the reactive power control at 214 respectively, they can be used to calculate the instantaneous 3-phase voltages at the voltage calculation 215. After that, these voltages can be used to calculate the switching signals for the power transistors using the pulse-width modulation (PWM) 216.

Figure 3:
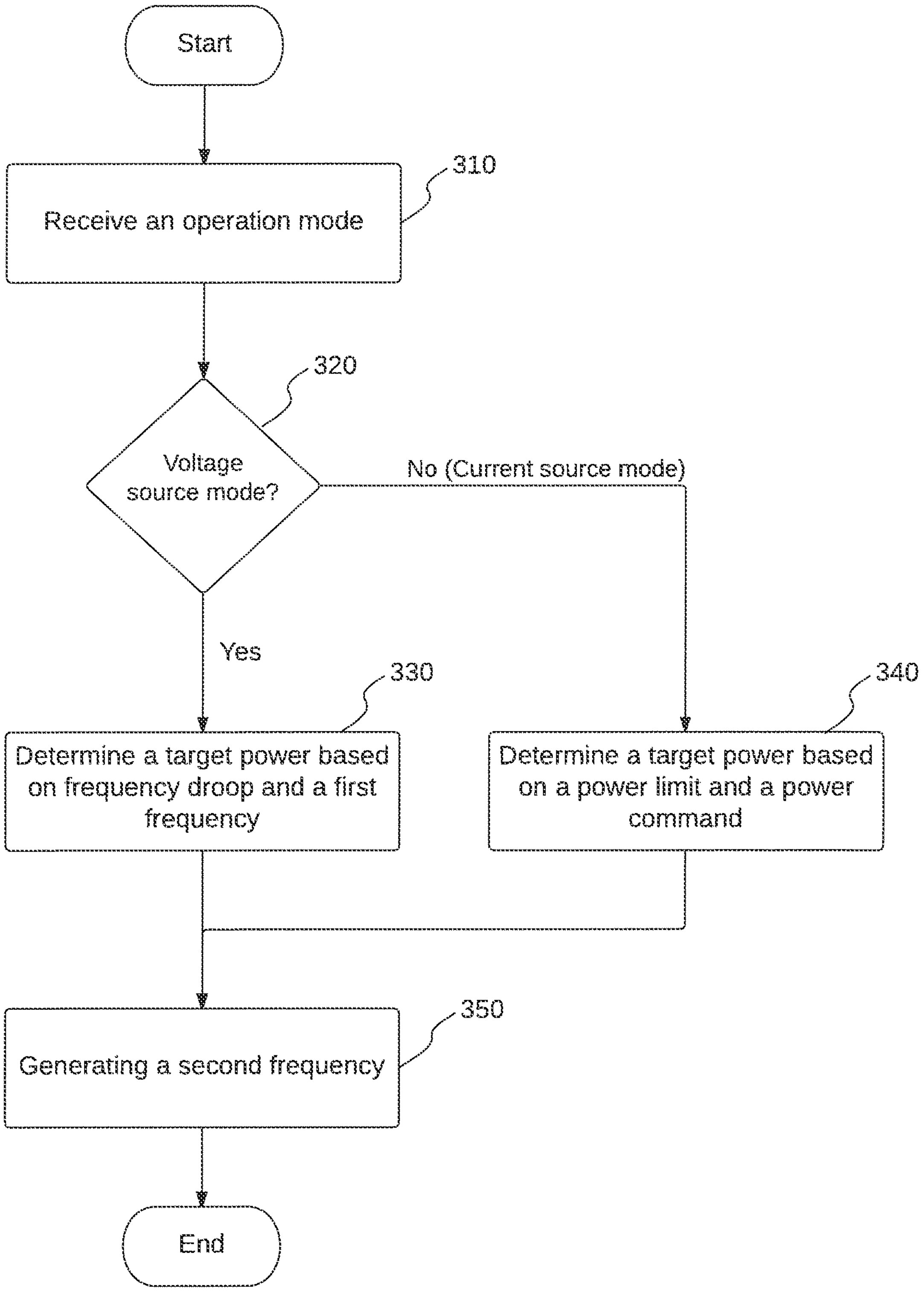
FIG. 3 is an example process flow that can be performed in the control system illustrated in FIG. 2.

FIG. 3 illustrates an example process flow that can be performed in the control system 200 illustrated in FIG. 2. For example, at step 310, the controller can receive an operation mode of the power inverter. As explained above, the power inverter can operate in two modes: voltage source mode and current source mode. The operation mode can be determined based on status of the grid contactor or mode settings of the power inverter. For example, the power inverter can dynamically set their operations to voltage source mode or current source mode by changing a setting using an external controller or based on the status of the contactor. At step 320, if the received operation mode is voltage source mode, a target power can be calculated based on real power frequency droop information and a first frequency of the power inverter at step 330 in accordance with the droop control line 410 in FIG. 4A. The real power frequency droop information can represent correlation between frequency and real power associated with each of the operation mode of the power inverter. The correlation between frequency and real power can be described in a two dimensional graph having x-axis for the frequency and y-axis for the real power as illustrated in FIG. 4A.

At step 320, if the received operation mode is not voltage source mode, this means that the power inverter operates in current source mode and the target power can be determined based on power limits and a predetermined power command at step 340. The power limits can comprise a minimum power and a maximum power. They can be determined based on the real power frequency droop information and the first frequency of the power inverter in accordance with the low 420 and high limit lines 430 in FIG. 4B. The maximum and minimum powers can be compared with a predetermined power command that is received from various sources such as a utility grid, an external controller, or the power inverter. Based on the comparison, the target power can be set to at least one of the minimum power, the maximum power, or the predetermined power command. Specifically, if the predetermined power command is lower than the minimum power, the target power is set to the minimum power. If the predetermined power command is higher than the maximum power, the target power is set to the maximum power. If the predetermined power command is between the minimum power and the maximum power, the target power is set to the predetermined power command.

At step 350, a second frequency can be generated based on the target power, a measured power, and a latency estimate of a simulated generator. The measured power can be calculated based on the electrical signals measured at the sensors. It can represent an output power of the power inverter. The latency estimate of the simulated generator can represent rotor inertia of the simulated generator. As explained above, the rotor inertia of the simulated generator can be determined based on mass of the simulated rotor, shape of the simulated rotor, or power of the simulated generator.

In an embodiment, the latency estimate can be adjusted depending on the mode of operation in the power inverter. For example, if the power inverter is in voltage source mode, a first latency estimate can be selected from a plurality of preset latency estimates. If the power inverter is in current source mode, a second latency estimate can be selected from the plurality of preset latency estimates. The second latency estimate can be the same as or different from the first latency estimate. By adjusting the latency estimate, the microgrid can be stabilized when the power inverter changes the mode of operation.

Figure 4B:
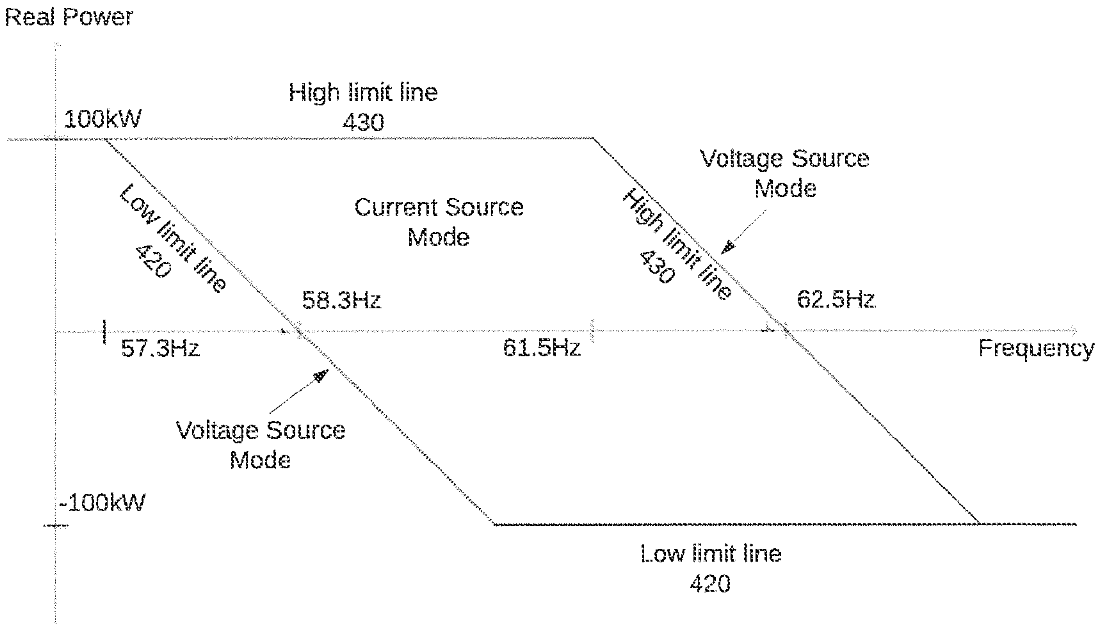
FIG. 4B is a graph illustrating real power vs. frequency droop in current source mode in accordance with an embodiment.

FIG. 4A illustrates real power vs. frequency droop in voltage source mode in accordance with an embodiment. FIG. 4B illustrates real power vs. frequency droop in current source mode in accordance with an embodiment. In voltage source mode, power inverters can set the frequency based on the droop control line 410. As illustrated in FIG. 4A, as real power increases, frequency decreases and as real power decreases, frequency increases. Following the droop control line 410 may allow the power inverters to share power equally and adjust to the load changes dynamically.

In current source mode, power inverters can have a low limit line 420 based on frequency and a high limit line 430 based on frequency. These limit lines can ensure the stability of microgrid by limiting excess export or import of power by the current source inverters. For example, if a solar array generates more power than what the loads and battery charging inverters can consume, the frequency will go up. The high limit line 430 can force the reduction of power generated from the solar array, so that the frequency of microgrid does not rise indefinitely. Outside the low 420 and high limit lines 430, the power inverter can effectively operate in voltage source mode because its behavior is similar to that of the voltage source mode. Within the low 420 and high limit lines 430, the power inverter can operate in current source mode.

Figure 5:
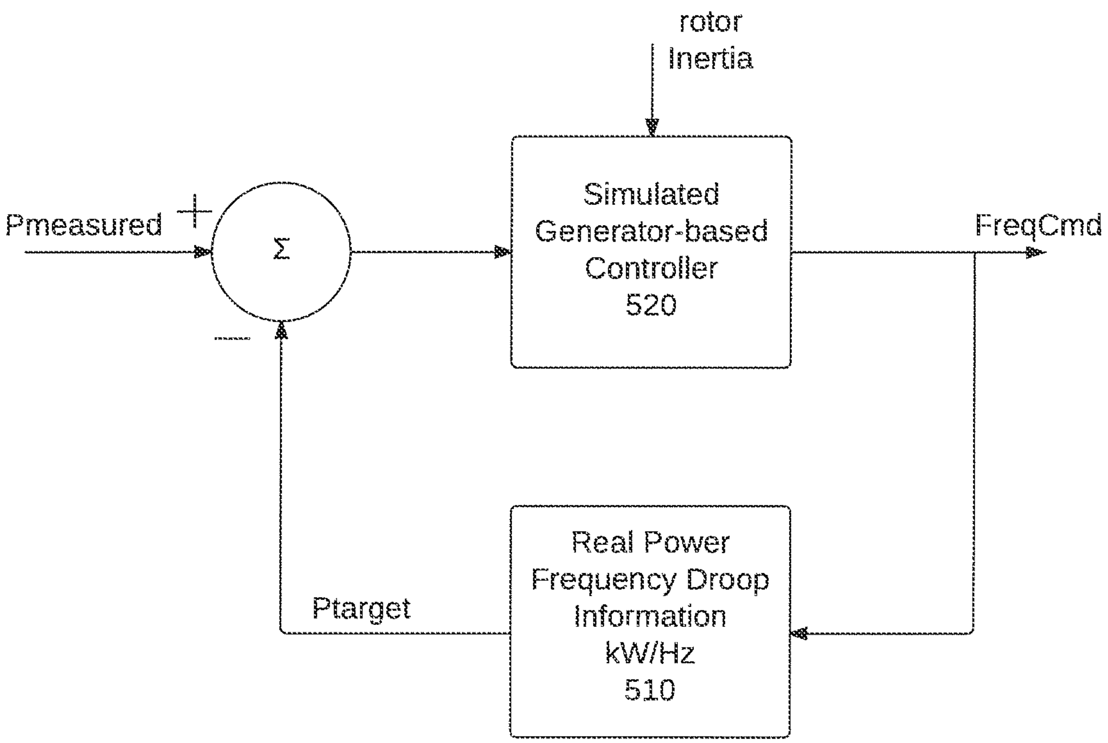
FIG. 5 is a block diagram illustrating real power control in voltage source mode in accordance with an embodiment.

FIG. 5 illustrates real power control illustrated in FIG. 2 for power inverters operating in voltage source mode. In voltage source mode, real power of the power inverters can be controlled by adjusting the frequency of the AC voltage of the power inverter. The frequency can be set by the frequency command (FreqCmd). First, the real power target ($P_{target}$) can be calculated using real power frequency droop information 510 based on the previous frequency command. The real power target and the measured real power ($P_{measured}$) can be fed into the simulated generator-based controller 520. This simulated generator-based controller 520 can simulate a generator with preset rotor inertia. This controller 520 can adjust the frequency of the rotor to generate the power specified by $P_{target}$. The rotor frequency of the simulated generator can be used as the frequency command for the power inverter.

Figure 6:
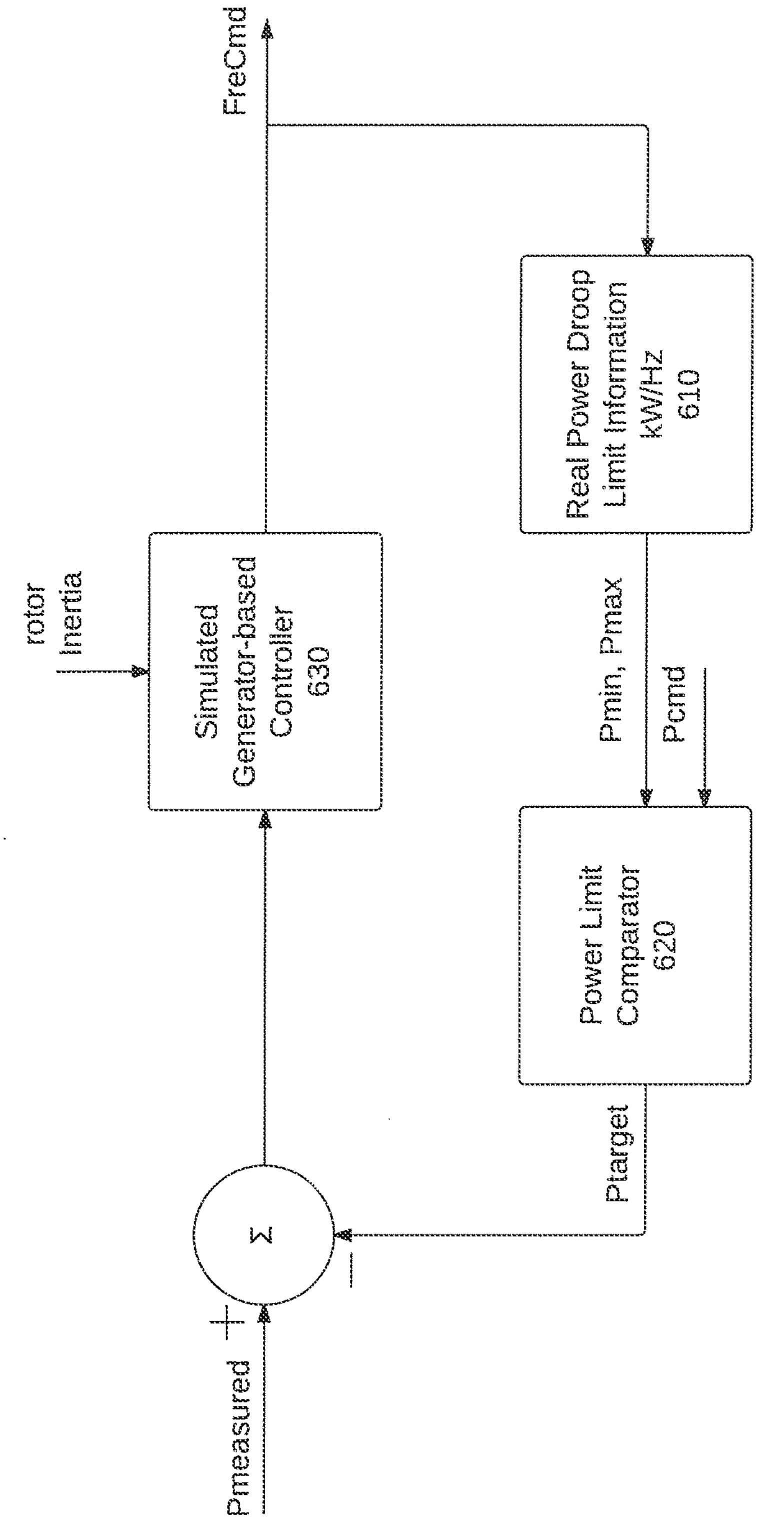
FIG. 6 is a block diagram illustrating real power control in current source mode in accordance with an embodiment.

FIG. 6 illustrates real power control illustrated in FIG. 2 for power inverters in current source mode. The control scheme is similar to that of the power inverter in voltage source mode as described in FIG. 5. The difference is that the real power command ($P_{cmd}$) can be set by a user, an external controller or by a process such as max power point tracking technique of a PV inverter. Based on the previous frequency command, the maximum power ($P_{max}$) and minimum power ($P_{min}$) can be obtained using the real power droop limit information 610 for the current source mode. These power limits can be applied to the real power command ($P_{cmd}$). For example, if $P_{cmd}$ is less than $P_{min}$, $P_{target}$ can be set to $P_{min}$. If $P_{cmd}$ is greater than $P_{max}$, $P_{target}$ can be set to $P_{max}$. Otherwise, $P_{cmd}$ is left unchanged and set as $P_{target}$. The resultant real power target ($P_{target}$) can be fed into the simulated generator-based controller 630 with the measured real power ($P_{measured}$). The output of the simulated generator-based controller 630 can be the frequency command for the power inverter.

In an embodiment, the simulated generator-based controller illustrated in FIGS. 5 and 6 may implement following equations to control the frequency of the AC voltage of the power inverter.

$$P_m = P_{target}$$

$$\tau = \frac{P_m - P_{measured}}{2\pi f_{prev}}$$

$$\Delta f = \frac{\tau}{2\pi J_r} T_{sw}$$

$$f_{cmd} = f_{prev} + \Delta f$$

where $P_{target}$ is the target power, $P_m$ is the simulated mechanical input power, $P_{measured}$ is the measure AC power, t is the net torque, $f_{prev}$ is previous generator frequency command (first frequency), Δf is generator frequency command change, $T_{sw}$ is the switching period of the inverter, $J_r$ is the generator's rotor moment of inertia (rotor inertia), and $f_{cmd}$ is the new generator frequency command which becomes the inverter frequency command (second frequency).

The frequency of simulated generator can be measured in Hz. It can be updated as the integral of the net power flow into the rotor of simulated generator divided by the simulated generator's rotor moment of inertia ($J_r$). The units of moment of inertia are kg×m$^2$ and it can be configured, for example, in a range between 0.01 and 300 kg×m$^2$. The net power flow into the rotor can be defined as the difference between the measured actual instantaneous AC output power ($P_{measured}$) as measured at the AC output and the simulated mechanical input power ($P_m$).

$P_m$ can effectively become the power target ($P_{target}$) for the AC port and can be controlled by two control schemes depending on the mode of operation in a power inverter. For example, if the power inverter is operating in current source mode, $P_m$ can be used as a power command for the AC port. This means that setting Pm to a particular value may result in the measured AC output power being equal to the constant value of the simulated $P_m$. Therefore, $P_m$ can become the operative variable for executing real power import or export commands (i.e. positive sign can indicate export and negative sign can indicate import). The AC power can follow the variable $P_m$ because the rotor of simulated generator can settle to a frequency equal to that of the grid/microgrid and to a phase angle offset from the grid phase angle that can result in the measured AC power being equal to $P_m$. If the measured AC power were greater than $P_m$, for instance, the simulated generator would see that the net power flow to/from the rotor was negative and would slow the rotor down. This can reduce the phase angle offset between the rotor and the grid which reduces real power flow. The converse can be the same when the measured AC power is less than $P_m$.

If the power inverter is operating in voltage source mode either on its own or in parallel with other inverters, $P_m$ can behave like a typical generator throttle control including droop law functionality based on FIG. 4A. This can make the rotor settling to a frequency that, according to the droop law, results in $P_m$. Therefore, the AC output power can be equal to whatever the load on the inverter is drawing. In addition, the droop laws in each of the power inverters in parallel can be adjusted relative to each other in order to share power among them as desired. Equal droop laws may result in equal sharing.

Figure 7:
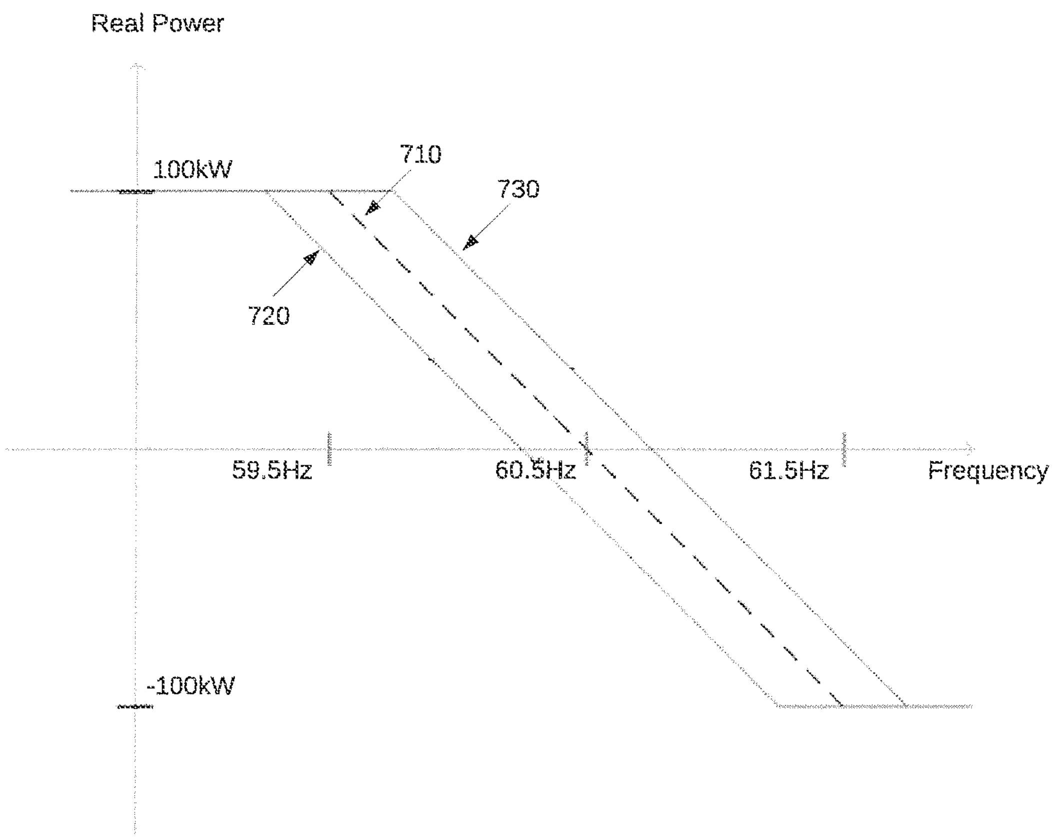
FIG. 7 is a graph illustrating droop offsets based on battery state of charge in accordance with an embodiment.

In an embodiment, real power vs frequency droop offsets based on battery state of charge can be included in order to encourage multiple batteries connected to a microgrid to stay evenly charged with each other. As illustrated in FIG. 7, the real power vs frequency droop offsets can include the droop lines corresponding to minimum battery state of charge 720 and maximum battery state of charge 730. The nominal droop line 710, which can be the same as the droop control line 410 in FIG. 4A, can be shifted to the left towards the minimum state of charge line 720 as the battery gets discharged. It can also be shifted to the right towards the maximum state of charge line 730.

In another embodiment, the simulated generator's moment of inertia $J_r$ can be dynamically adjustable. For example, $J_r$ can be changed when the power inverters are switching between current source mode and voltage source mode. This means that $J_r$ can be optimized independently for each of the operating modes. Even if $J_r$ is changed suddenly, the output of the power inverter is not affected by it if the power inverter is in steady state because it can only affect the dynamic behavior. Therefore, changing $J_r$ suddenly will have no risk of causing a transient response.

For stability, a frequency oscillation damper can be added to the control system. This damper can apply torque to the rotor of simulated generator that opposes a changing frequency. This damper may help damp out the frequency oscillations that naturally occur in this type of system after any step change in power. In an embodiment, a torque is applied in proportion to the difference between the present generator frequency and a calculated average generator frequency, as if the engine throttle control were intentionally damping oscillations in generator frequency.

Figure 8:
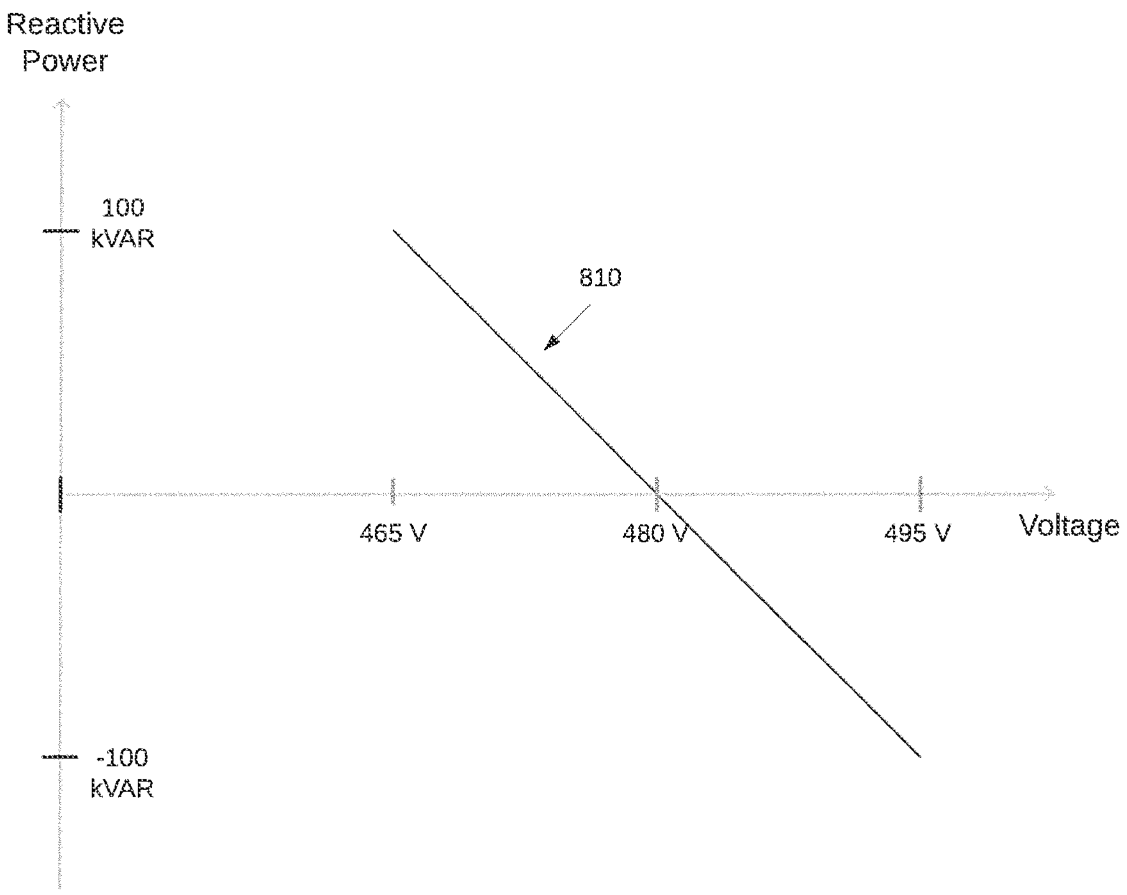
FIG. 8 is a graph illustrating reactive power vs. voltage droop in voltage source mode in accordance with an embodiment.

FIG. 8 illustrates reactive power droop line 810 for voltage source inverters in accordance with an embodiment. As illustrated in FIG. 8, as reactive power increases, a power inverter decreases its voltage. As reactive power decreases, the power inverter increases its voltage. This may allow multiple power inverters to share reactive loads and also prevent reactive power from flowing between the power inverters. In current source mode, the power inverter can follow a reactive power command that is normally set to 0 which creates a power factor of 1. It is also possible to set the reactive power command to a non-zero value to perform power factor correction.

Figure 9:
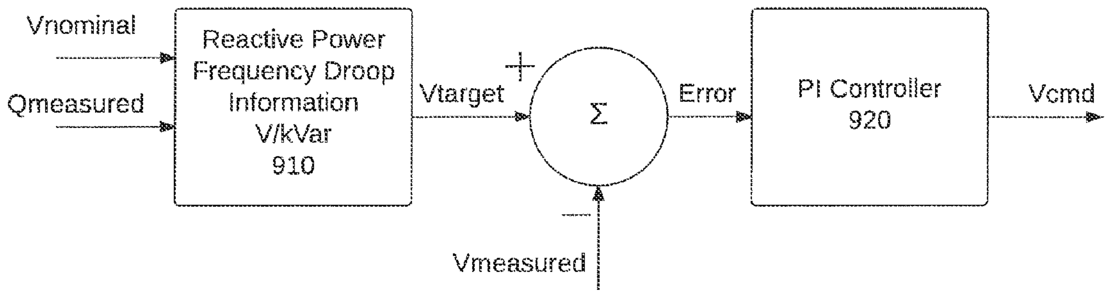
FIG. 9 is a block diagram illustrating reactive power control in voltage source mode in accordance with an embodiment.

FIG. 9 illustrates reactive power control illustrated in FIG. 2 for power inverters in voltage source mode. Reactive power can be controlled by adjusting the magnitude of the AC voltage of the power inverter. It can be set by the voltage magnitude command ($V_{cmd}$). To determine the voltage magnitude command, first, the target voltage ($V_{target}$) can be calculated using the reactive power frequency droop information 910 based on the nominal voltage ($V_{nominal}$) and the measured reactive power ($Q_{measured}$). The reactive power frequency droop information 910 is illustrated in FIG. 8. Next, the PI controller 920 can calculate the voltage magnitude command for the power inverter using the target voltage and the measured voltage.

Figure 10:
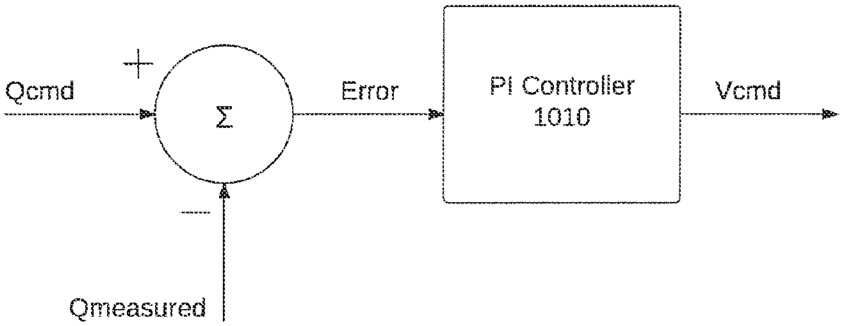
FIG. 10 is a block diagram illustrating reactive power control in current source mode in accordance with an embodiment.

FIG. 10 illustrates reactive power control illustrated in FIG. 2 for power inverters in current source mode. To control the reactive power in current source mode, the voltage magnitude command ($V_{cmd}$) can be calculated by the PI controller 1010 based on the reactive power command ($Q_{cmd}$) and measured reactive power ($Q_{measured}$).

Figure 11:
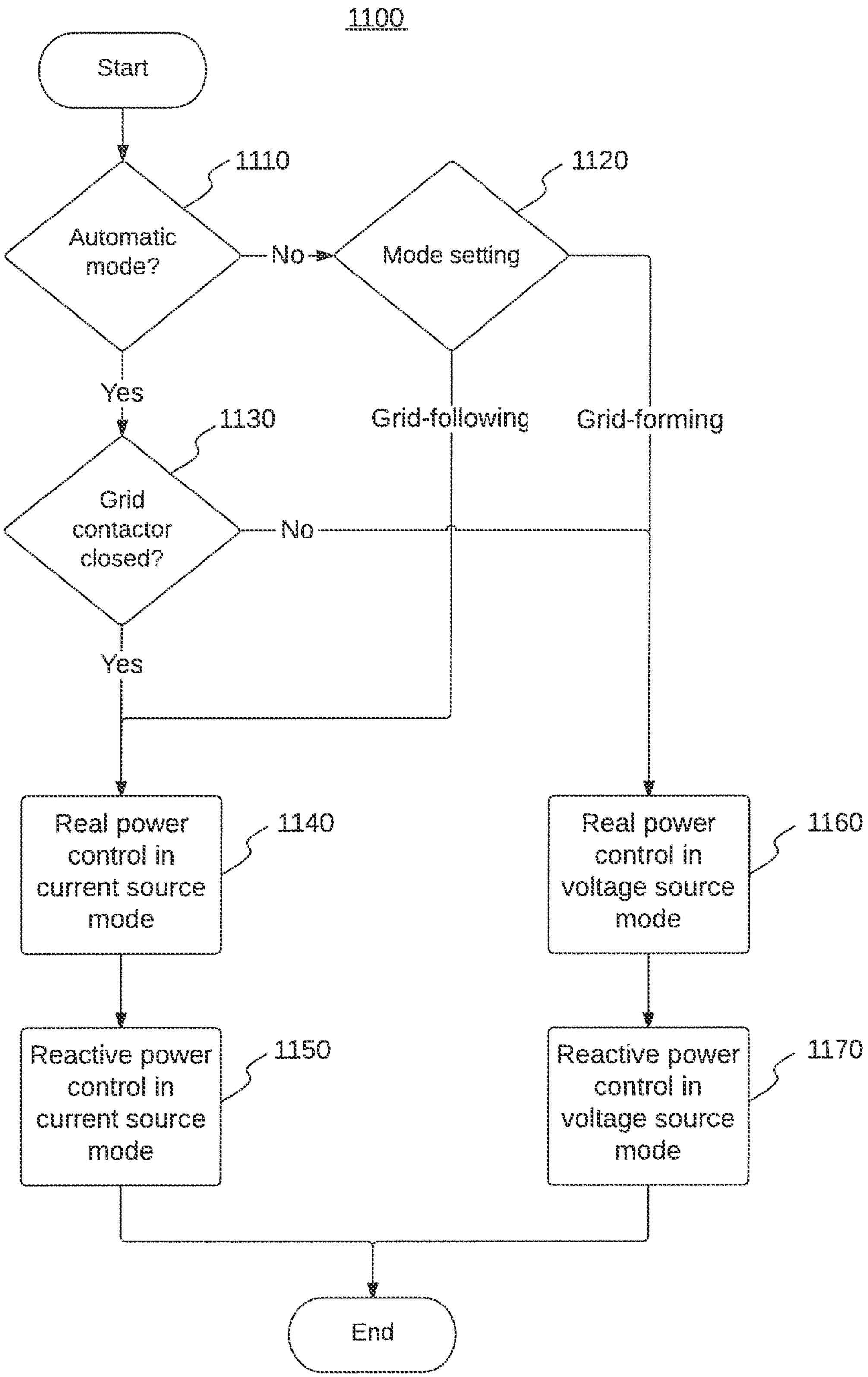
FIG. 11 is a flow diagram illustrating overall power control scheme in accordance with an embodiment.

FIG. 11 illustrates overall power control process using the control system illustrated in FIG. 2. At step 1110, the controller can check if it is operating in automatic mode. If the controller is in automatic mode, at step 1130, the power inverter can check the status of the grid contactor that connects the power inverter or multiple power inverters to the grid or another grid-forming source such as an AC generator. If the grid contactor is closed (i.e. the power inverter is in current source mode), the controller can control the real power at step 1140 and the reactive power at step 1150. If the grid contactor is open (i.e. the power inverter is in voltage source mode), the controller can control the real power at step 1160 and the reactive power at step 1170.

If the controller is in manual mode, at step 1120, the power inverter can check the mode setting. If the mode setting is set to grid-following (i.e. the power inverter is in current source mode), the controller can control the real power at step 1140 and the reactive power at step 1150. If the mode setting is set to grid-forming (i.e. the power inverter is in voltage source mode), the controller can control the real power at step 1160 and the reactive power at step 1170. The mode setting can be preset or adjustable. For example, the mode setting for PV inverters is grid-following because PV inverters usually operate in current source mode. The mode setting can also be changed on the fly by an external controller by means of a communication protocol such as Modbus.

Figure 12:
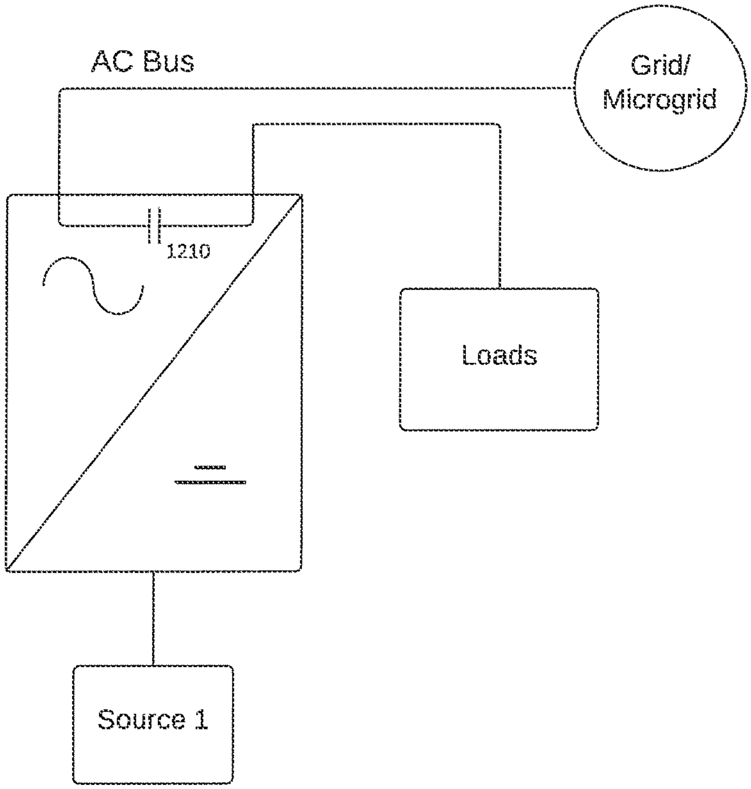
FIG. 12 is a block diagram illustrating an internal grid contactor in accordance with an embodiment.
Figure 13:
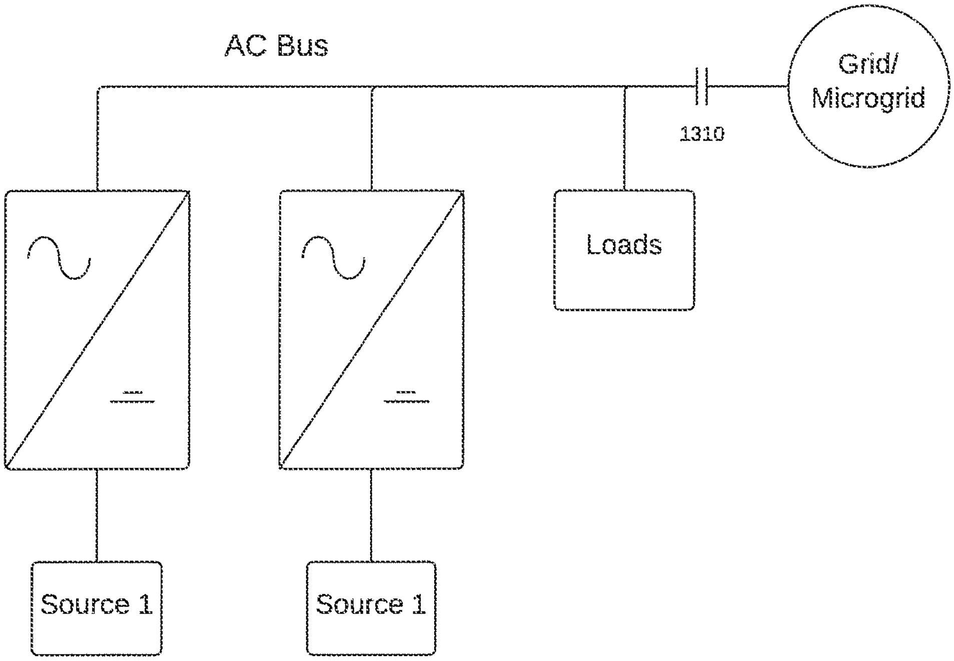
FIG. 13 is a block diagram illustrating an external grid contactor in accordance with an embodiment.

The grid contactor that connects the power inverter to the grid can be internal or external to the power inverter. FIG. 12 illustrates an internal grid contactor 1210 and FIG. 13 illustrates an external grid contactor 1310 in accordance with embodiments. The internal grid contactor 1210 can be controlled by a power inverter based on the grid (or microgrid) voltage and frequency measurements. If the grid voltage and frequency exceed the pre-determined range, for example, 88%-110% for voltage and 59.3 Hz-60.5 Hz for frequency based on IEEE1547, the internal grid contactor 1210 can be opened. When the grid voltage and frequency are returned to the ranges, the internal grid contactor 1210 can be closed. The external grid contactor 1310 can be controlled in a similar way by one of the power inverters, another controller, or a controller of an AC generator. In case of the controller of an AC generator, after the controller synchronizes the AC generator to the microgrid, it can close the external grid contactor 1310.

Figure 14:
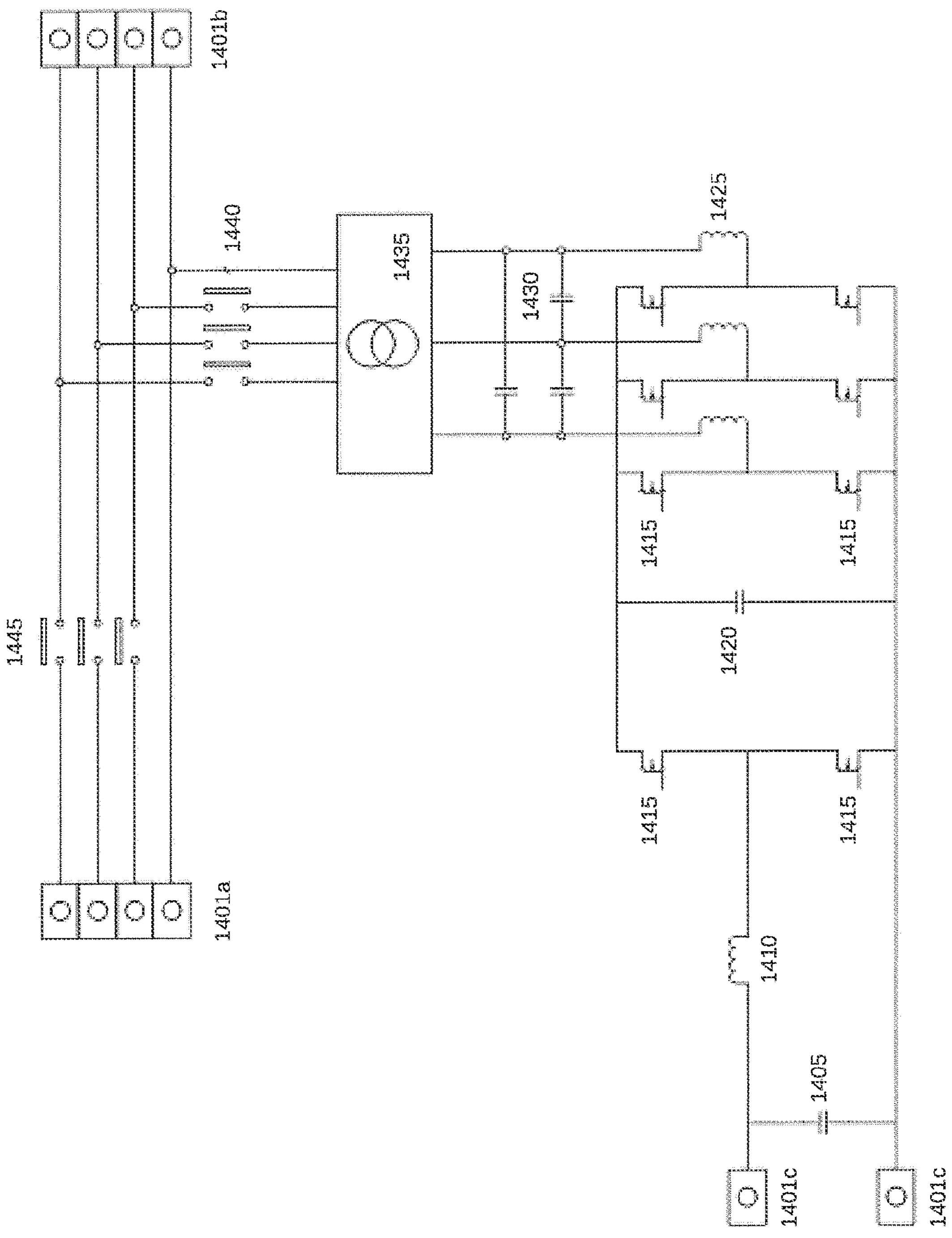
FIG. 14 is a block diagram illustrating hardware configuration of a power inverter in accordance with an embodiment.

FIG. 14 depicts hardware configuration for a power inverter that can be used in the control system illustrated in FIG. 2. The power inverter can comprise connection terminals 1401*a-c*, a DC filter capacitor 1405, a DC filter inductor 1410, power transistors 1415, a DC central bus capacitor 1420, AC filter inductors 1425, AC filter capacitors 1430, an optional isolation transformer 1435, an inverter AC contactor 1440, a grid AC contactor 1445, etc. The power transistors 1415 can include power diodes, thyristors, power MOSFETs, IGBTs, or the like.

While the control systems and methods for power inverters has been described in connection with the various embodiments of the various figures, it is to be understood that other similar embodiments may be used or modifications and additions may be made to the described embodiments without deviating therefrom. For example, one skilled in the art will recognize that the simulated generator-based control scheme as described in the instant application may apply to any electrical grid, and any power electric devices to control power in the electrical grid. Therefore, the control systems and methods described herein should not be limited to any single embodiment, but rather should be constructed in breadth and scope in accordance with the appended claims.

What is claimed:

1. A control system for a power inverter, the control system comprising:

a plurality of sensors configured to measure electrical signals indicative of output voltages and output currents of the power inverter; and a controller coupled to the power inverter and the plurality of sensors, the controller being configured to:

when the power inverter is in a voltage source mode, determine a target power based on real power frequency droop information and a first frequency at which the power inverter operates;

when the power inverter is in a current source mode, determine the target power based on a power limit and a predetermined power command;

generate a frequency command based on the target power, a measured power, and a latency estimate of a simulated generator; and send the frequency command to the power inverter so as to cause the power inverter to operate at a second frequency that is different than the first frequency.

2. The control system of claim 1, wherein the real power frequency droop information is indicative of correlation between a frequency and a real power associated with at least one of the voltage source mode or the current source mode.

3. The control system of claim 1, wherein the predetermined power command is received, at the controller, from at least one of a utility grid, an external controller, or the power inverter.

4. The control system of claim 1, wherein the power limit comprises at least one of a minimum power or a maximum power.

5. The control system of claim 4, wherein the minimum and maximum powers at the first frequency are determined based on the real power frequency droop information.

6. The control system of claim 4, wherein the controller is further configured to:

set the target power to the minimum power if the predetermined power command indicates a power that is lower than the minimum power;

set the target power to the maximum power if the power indicated in the predetermined power command is higher than the maximum power; and set the target power to the power indicated in the predetermined power command if the power indicated in the predetermined power command is between the minimum power and the maximum power.

7. The control system of claim 1, wherein the latency estimate is indicative of a rotor inertia of the simulated generator.

8. The control system of claim 7, wherein the latency estimate is determined based on at least one of mass of a rotor of the simulated generator, shape of the rotor of the simulated generator, or power of the simulated generator.

9. The control system of claim 1, wherein the controller is further configured to perform at least one of:

selecting a first latency estimate from a plurality of preset latency estimates if the power inverter is in the voltage source mode; or selecting a second latency estimate from the plurality of preset latency estimates if the power inverter is in the current source mode.

10. The control system of claim 1, wherein the controller is further configured to provide the second frequency to the power inverter to control an output power of the power inverter.

11. The control system of claim 1, wherein the measured power is indicative of an output power of the power inverter.

12. A control method for a power inverter, the control method comprising:

receiving an operation mode of the power inverter;

when the operation mode of the power inverter is a voltage source mode, determining a target power based on real power frequency droop information and a first frequency at which the power inverter operates;

when the operation mode of the power inverter is a current source mode, determining a target power based on a power limit and a predetermined power command;

generating a frequency command based on the target power, a measured power, and a latency estimate of a simulated generator; and sending the frequency command to the power inverter so as to cause the power inverter to operate at a second frequency that is different than the first frequency.

13. The control method of claim 12, wherein the real power frequency droop information is indicative of correlation between a frequency and a real power associated with at least one of the voltage source mode or the current source mode.

14. The control method of claim 12, wherein the power limit comprises at least one of a minimum power or a maximum power.

15. The control method of claim 14, further comprising:

determining the minimum power at the first frequency based on the real power frequency droop information; and determining the maximum power at the first frequency based on the real power frequency droop information.

16. The control method of claim 15, further comprising:

receiving the predetermined power command from at least one of a utility grid, an external controller, or the power inverter.

17. The control method of claim 16, further comprising:

setting the target power to the minimum power if the predetermined power command indicates a power is lower than the minimum power;

setting the target power to the maximum power if the power indicated in the predetermined power command is higher than the maximum power; and setting the target power to the power indicated in the predetermined power command if the power indicated in the predetermined target power is between the minimum power and the maximum power.

18. The control method of claim 12, wherein the latency estimate is indicative of a rotor inertia of the simulated generator.

19. The control method of claim 18, wherein the latency estimate is determined based on as least one of mass of a rotor of the simulated generator, a shape of the rotor of the simulated generator, or power of the simulated generator.

20. The control method of claim 12, wherein generating a second frequency based on the target power, a measured power, and a latency estimate of a simulated generator comprises at least one of:

selecting a first latency estimate from a plurality of preset latency estimates if the operation mode of the power inverter is the voltage source mode; or selecting a second latency estimate from the plurality of preset latency estimates if the operation mode of the power inverter is the current source mode.

21. The control method of claim 12, wherein the measured power is indicative of an output power of the power inverter.

* * * * *